United States Patent
Stefan et al.

(10) Patent No.: US 9,169,115 B2
(45) Date of Patent: Oct. 27, 2015

(54) METHOD AND DEVICE FOR REDUCING THE LIKELIHOOD OF THEFT AT A GAS STATION OR A CHARGING STATION FOR MOTOR VEHICLES

(71) Applicant: Ford Global Technologies, LLC, Dearborn, MI (US)

(72) Inventors: Frederic Stefan, Aachen (DE); Uwe Gussen, Huertgenwald (DE); Christoph Arndt, Moerlen (DE); Erik Alpman, Aachen (DE)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/172,801

(22) Filed: Feb. 4, 2014

(65) Prior Publication Data

US 2014/0236444 A1 Aug. 21, 2014

(30) Foreign Application Priority Data

Feb. 18, 2013 (DE) .......................... 10 2013 202 568

(51) Int. Cl.
- *B67D 7/06* (2010.01)
- *B60L 11/18* (2006.01)
- *G07F 15/00* (2006.01)
- *B60K 1/00* (2006.01)

(52) U.S. Cl.
CPC . *B67D 7/065* (2013.01); *B60K 1/00* (2013.01); *B60L 11/1848* (2013.01); *B67D 7/067* (2013.01); *B67D 7/068* (2013.01); *G07F 15/005* (2013.01); *Y02T 90/12* (2013.01); *Y02T 90/128* (2013.01)

(58) Field of Classification Search
CPC ........ B67D 7/064; B67D 7/065; B67D 7/067; B67D 7/068; G07F 15/005; B60L 11/1848
USPC ...................................................... 701/70, 93
See application file for complete search history.

(56) References Cited

U.S. PATENT DOCUMENTS 5,462,439 A * 10/1995 Keith ............................ 320/109
5,805,057 A *  9/1998 Eslaminovin ............ 340/426.12
(Continued)

FOREIGN PATENT DOCUMENTS

DE           4431070 A1    3/1996
DE          20206694 U1    8/2002
(Continued)

OTHER PUBLICATIONS

"Maryland—Facts about gasoline safety", Maryland Department of the Environment, Mar. 19, 2009, 2 pages, downloaded from: http://www.mde.state.md.us/assets/document/factsheets/gasadvisory.pdf.*

Primary Examiner — Behrang Badii
Assistant Examiner — David Testardi
(74) Attorney, Agent, or Firm — Julia Voutyras; Alleman Hall McCoy Russell & Tuttle LLP

(57) ABSTRACT

A method for preventing fuel theft at a gas station or a charging station for motor vehicles is provided. The method includes determining whether a refueling process or recharging process of a motor vehicle is taking place and activating an emergency operating mode of the motor vehicle until a payment for the refueling process or the recharging process has taken place, the emergency operating mode configured to limit vehicle speed.

19 Claims, 7 Drawing Sheets

(56) References Cited

U.S. PATENT DOCUMENTS

| | | | |
|---|---|---|---|
| 6,157,871 A * | 12/2000 | Terranova | 700/231 |
| 6,195,648 B1 * | 2/2001 | Simon et al. | 705/40 |
| 6,374,870 B1 * | 4/2002 | Muller | 141/94 |
| 6,568,262 B1 * | 5/2003 | Chandebois | 73/291 |
| 7,129,852 B2 * | 10/2006 | Aslund et al. | 340/426.11 |
| 7,266,507 B2 * | 9/2007 | Simon et al. | 705/35 |
| 7,769,505 B2 * | 8/2010 | Rask et al. | 701/22 |
| 8,265,816 B1 * | 9/2012 | LaFrance | 701/22 |
| 8,436,721 B1 * | 5/2013 | Lee et al. | 340/426.11 |
| 2003/0041330 A1 * | 2/2003 | Smith | 725/105 |
| 2006/0022792 A1 * | 2/2006 | Cooley et al. | 340/5.1 |
| 2006/0142916 A1 * | 6/2006 | Onuma et al. | 701/38 |
| 2007/0136083 A1 * | 6/2007 | Simon et al. | 705/1 |
| 2007/0185728 A1 * | 8/2007 | Schwarz et al. | 705/1 |
| 2007/0192012 A1 * | 8/2007 | Letang | 701/93 |
| 2008/0221743 A1 * | 9/2008 | Schwarz et al. | 701/2 |
| 2009/0056436 A1 * | 3/2009 | Miceli et al. | 73/290 R |
| 2009/0057041 A1 * | 3/2009 | Kamaga | 180/65.2 |
| 2010/0228415 A1 * | 9/2010 | Paul | 701/22 |
| 2011/0035049 A1 * | 2/2011 | Barrett | 700/232 |
| 2011/0140835 A1 * | 6/2011 | Ishibashi | 340/5.2 |
| 2011/0181241 A1 * | 7/2011 | Badger | 320/109 |
| 2013/0009597 A1 * | 1/2013 | Boot | 320/109 |
| 2013/0145482 A1 * | 6/2013 | Ricci et al. | 726/28 |

FOREIGN PATENT DOCUMENTS

| | | | | |
|---|---|---|---|---|
| DE | 102005026433 A1 | | 12/2006 | |
| DE | 102010028682 A1 * | | 11/2011 | |
| DE | 102011100781 A1 | | 12/2011 | |
| EP | 0095113 A2 | | 11/1983 | |
| EP | 0712768 A1 | | 5/1996 | |
| EP | 1195349 A1 * | | 4/2002 | B67D 5/06 |
| FR | 2970923 A1 * | | 8/2012 | |
| GB | 2365412 A * | | 2/2002 | B67D 5/33 |
| JP | 06270766 A * | | 9/1994 | B60R 25/04 |
| JP | 11049299 A * | | 2/1999 | B67D 5/32 |
| JP | 2006224900 A * | | 8/2006 | |
| WO | WO 9831574 A2 * | | 7/1998 | B60R 25/04 |

* cited by examiner

METHOD AND DEVICE FOR REDUCING THE LIKELIHOOD OF THEFT AT A GAS STATION OR A CHARGING STATION FOR MOTOR VEHICLES

CROSS REFERENCE TO RELATED APPLICATIONS

The present application claims priority to German Patent Application Number 102013202568.8, filed on Feb. 18, 2013, the entire contents of which are hereby incorporated by reference for all purposes.

FIELD

The present disclosure relates to a method and a device for reducing the likelihood of theft at a gas station or a charging station for motor vehicles.

BACKGROUND AND SUMMARY

With rising oil prices, gas stations are increasingly subjected to cases of fuel theft. The magnitude of the theft is many countries is quite large and accounts for sizeable monetary losses for the gas stations. In order to counter the problem of fuel theft, gas stations may be fitted with monitoring cameras that record the auto license plate of each vehicle being refueled in order to enable the detection of the respective offender in the event of a theft. This is, however, costly on the one hand and on the other hand (e.g. in cases of the use of false license plates or stolen vehicles) provides no guarantee that the gas station operator will actually be compensated. Specifically, it may be costly to track down the thief using the license plate as an identifier. Legal fees associated with criminal prosecution of the thieves may also be costly. It will be appreciated that theft has also been anticipated in vehicles using other types of fuel (e.g., diesel, ethanol, hydrogen, etc.) or forms of energy such as electricity.

To address at least some of the aforementioned problems a method for preventing fuel theft at a gas station or a charging station for motor vehicles is provided. The method includes determining whether a refueling process or recharging process of a motor vehicle is taking place and activating an emergency operating mode of the motor vehicle until a payment for the refueling process or the recharging process has taken place, the emergency operating mode configured to limit vehicle speed. In this way, the likelihood of fuel or electricity theft from refueling or recharging stations is reduced. As a result, monetary losses corresponding to fuel theft or energy theft at refueling or recharging stations is reduced. It will be appreciated that implementing this type of system in a vehicle may less costly than tracking down and prosecuting fuel thieves via security cameras mounted at the fuel stations.

The above advantages and other advantages, and features of the present description will be readily apparent from the following detailed description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

Figure 1:
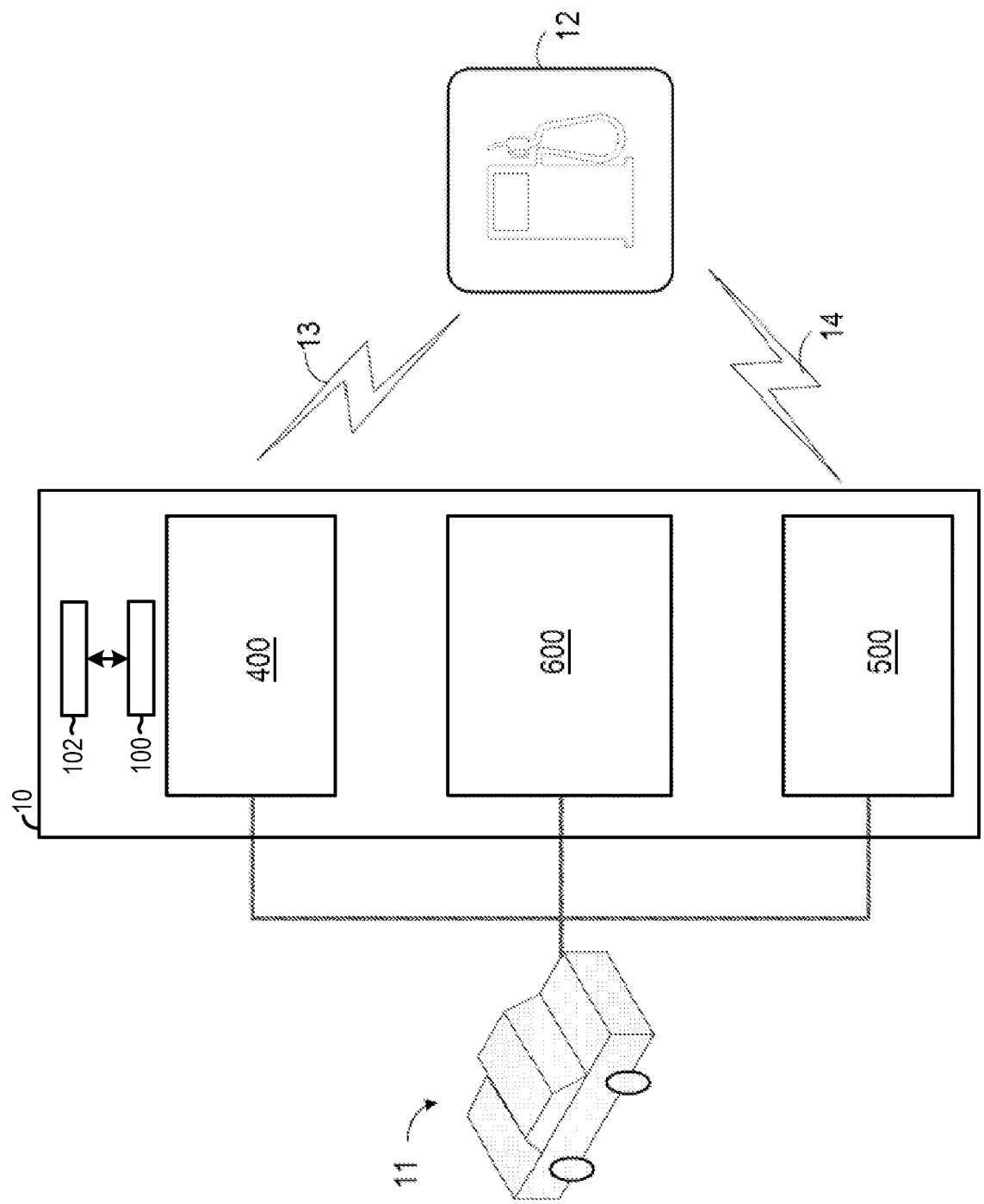
FIG. 1 shows a schematic diagram of an example vehicle including a device.

The invention is explained below in detail with reference to the accompanying figures.

DETAILED DESCRIPTION

A method for reducing the likelihood (e.g., preventing) of fuel theft from a gas station or a charging station for motor vehicles is described herein. The method may include determining whether a refueling process or recharging process of a motor vehicle is taking place and activating an emergency operating mode of the motor vehicle until a payment has been made for the refueling process or recharging process. The emergency operating mode may be configured to limit vehicle speed. The term "fuel" is to be understood to mean not only gasoline or diesel fuel, but also encompasses other forms of energy suitable for propelling a motor vehicle (that is also e.g. electric current in the case of a partially or completely electrically driven vehicle). Correspondingly, when a "gas station" is mentioned in the disclosure, the corresponding disclosure can be applied not only to a fuel pump for gasoline or diesel fuel, but analogously also to a station for refilling with other types of fuel or propellants or also for a charging station for partially or entirely electrically driven vehicles. Additional exemplary fuels include hydrogen, natural gas (e.g., compressed natural gas), electricity, etc.

In the method described herein when a refueling process is being performed by a motor vehicle, the motor vehicle may be switched into an "emergency operating mode" (e.g., "limp mode") which may restrict vehicle operating capability. For instance, the vehicle's speed, engine output, etc., may be limited when the "emergency operating mode" is active. The "emergency operating mode" may be discontinued when payment for the refueling process has been made, in some examples. In this way, the likelihood of fuel theft is decreased.

In one example, the emergency operating mode may be activated following a defined warning period. In this way, the driver can be warned by the vehicle information system that the vehicle can still be operated for a certain period of time, the warning period, and the driver can catch up with the payment process during said time, but after the warning period ends the emergency operating mode may be switched on to reduce the likelihood of fuel theft. Further in one example, the remaining warning period until activation of the emergency operating mode is displayed to the driver. Additionally or alternatively, audio cues may also be provided to the driver to indicate the duration of the warning period, in some examples.

In one specific example, the warning period may be variable (e.g., the warning period may be shorter or longer depending on the case and/or the situation). The variable warning period provides for a situation where driver may not be expected to refrain from using the vehicle despite non-payment. The warning period may be determined using at least one of the following parameters; environmental parameters (e.g., time of day such as daytime or nighttime), geographical position, and weather (e.g., ambient temperature). In such an example, one or more of the aforementioned parameters may be queried at a central data server. For instance, in bad weather the emergency operating mode may be disabled. In another example, if a database query to a central data server of the gas station operator reveals that this vehicle or driver is already known in connection with a previous non-payment, then the emergency operating mode may be directly activated.

In one example, the emergency operating mode may be activated (e.g., solely activated) on the basis of "internal" information (i.e., information related to the internal state of the motor vehicle). The internal information may be related to the stationary state, the state or the position of the filler cap, the position of the tank filler neck, and/or the fuel level or state of charge of the motor vehicle.

Further in one example, the emergency operating mode is configured such that the speed achievable by the motor vehicle may be limited to a maximum of 15 km/h or in some cases a maximum of 10 km/h, for instance. Thus in the emergency operating mode the motor vehicle may not be completely shut down, but it is still possible to continue to move the motor vehicle to a parking space at the gas station, for example. However, in the emergency operating mode the speed may be limited such that it may be undesirable to travel on roads outside the gas station.

Furthermore, the emergency operating mode may be designed to allow the maneuvering of the motor vehicle on the site of the gas station or charging station that may need to release the space occupied during the refueling or recharging process. For example, the fuel station and/or charging station may be busy and it may be desirable to refuel or recharge a large number of vehicles quickly. Therefore, in one example the emergency operating mode is configured to enable low speed manoeuvers of the motor vehicle.

The reduction in the likelihood of fuel theft may take place in three stages, wherein the first stage involves detecting the refueling process of a motor vehicle, the second stage involves changing the motor vehicle involved into the emergency operating mode described above, and the third stage involves deactivating said emergency operating mode following payment for the fuel. In one example, the emergency operating mode is deactivated once the payment for the refueling process or recharging process has been made.

Further in one example, determining whether a refueling process or recharging process of a motor vehicle is taking place and/or determining whether a payment for the refueling process or recharging process has been made is/are carried out using a wireless communication. However in other example, additional or alternate forms of communications may be used to determine if a refueling process is taking place and/or if a payment for the refueling has been made. In other examples, an authorization or trigger signal for deactivating the emergency operating mode following completion of payment for the refueling process or recharging process may be stored on the ignition key of the motor vehicle or a special component (e.g., a "token") provided by the operator of the gas station or charging station may be used to generate the trigger signal for deactivating the emergency operating mode. Additionally or alternatively, determining whether a refueling process or recharging process of a motor vehicle is taking place may be performed using a camera device or a radar device.

Still further in one example, determining if a refueling process or a recharging process of a motor vehicle is being carried out may be based on data (e.g., location data such as geographical coordinates) from a navigation system. When a navigation system is used to determine if a refueling process is being carried out the accuracy of this determination may be increased. As a result, the likelihood of unwanted activation of the emergency activation mode may be reduced. Moreover, use of the navigation system in this way may prevent the emergency activation mode from being activated in the case of refilling the vehicle using a fuel canister, say for example in a remote location away from a fueling station, on the user's property, etc.

In one example, determining whether a refueling process or a recharging process of a motor vehicle is taking place includes monitoring the level in the tank or the state of charge of the motor vehicle.

It will be appreciated that the aforementioned steps may be implemented via a device which may be included in the vehicle. The device may include code stored in memory executable by a processor to perform at least some of the aforementioned steps. The steps may also be implemented via a control system in the vehicle including sensors, actuators, etc. The device may include a unit for determining whether a refueling process of a motor vehicle is taking place. The device may further include a unit for determining whether a payment for the refueling process has taken place. The device may further include a unit for activating or deactivating an emergency operating mode of the motor vehicle depending on detection of the refueling process or a completed payment for the refueling process. One or more of the aforementioned units may be stored in memory executable by a processor, in one example.

FIG. 1 shows a schematic illustration of a device 10. The device 10 may include code stored in memory 100 executable by a processor 102. Units may carry out various functional tasks and therefore portions or in some cases the entirety of one or more of the units may be stored in the memory 100, in one example. It will be appreciated that the units may also include sensors and/or actuators. The device 10 includes a unit 400 for detecting a refueling process of a motor vehicle 11 at a gas station, fuel pump, or charging station (12). Indicator 12 represents at least one of a gas station, fuel pump, and charging station. A unit 500 for monitoring or detecting the payment for the refueling process is illustrated in FIG. 1. The unit 500 is included in the device 10. Additionally, a unit 600 for activating or deactivating an emergency operating mode depending on the detection of the refueling process or its completed payment. Specifically, the unit 600 may be configured to activate an emergency operating mode limiting vehicle speed when it is determined that a refueling process is taking place or has been completed, in one example. Additionally, the unit 600 may be configured to deactivate the emergency operating mode when it is determined that payment has been made for the refueling process.

A wireless communication between unit 400 or unit 500 and the gas station 12 is symbolized by numerical indicators 13 and/or 17. The operation of units 400, 500, and 600 is explained in greater detail below using the flow charts of FIG. 4, 5, and/or 6.

Figure 2:
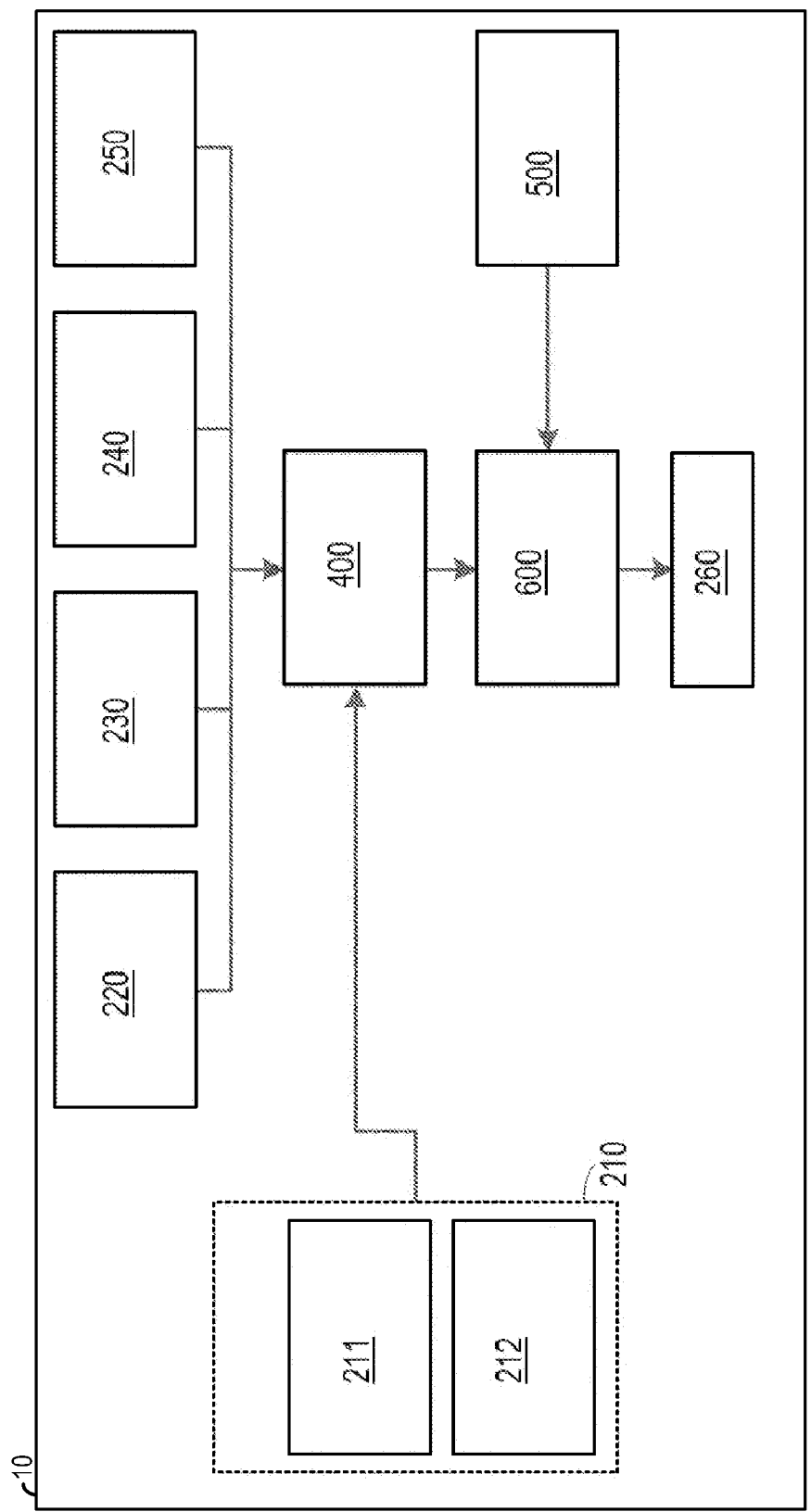
FIG. 2 shows a detailed schematic illustration of components used in the device shown in FIG. 1.

FIG. 2 shows a detailed schematic illustration of the components used in the device 10 and their functionalities. The block diagram shown in FIG. 2 depicts unit 600 for activating or deactivating the emergency operating mode in response to output signals provided by unit 400 (for detecting a refueling process) and unit 500 (for monitoring or detecting the payment for the refueling process) or depending on whether a refueling process has completed and whether the refueling has been paid for. As will be explained in more detail below, the status of the corresponding flag signals of units 400 or 500 can be transmitted here to unit 600 for activating or deactivating the emergency operating mode.

FIG. 2 shows a unit 260 for communication with the driver or a suitable device of the driver, such as a smart phone, PDA, etc. ("HMI-unit"). The unit 260 is configured to inform the driver about the present state of the device for reducing the likelihood of theft. A monitoring device 210 for detecting or monitoring the state of the motor vehicle 11 in respect of its supply with fuel is also schematically represented in FIG. 2, wherein depending on the drive technology it can be a fuel display or fuel device 211 for monitoring the fuel gauge or even a device 212 for monitoring the battery state (e.g. for an electric vehicle), for example. A rise of the fuel level of the motor vehicle 11 between the states at the start and end of the switch-off phase of the motor vehicle may be used here as an indication of a refueling process. Furthermore, additional measures or interactions in connection with the motor vehicle tank (e.g. the use of the filler cap) may be used as an indication of a refueling process.

Figure 3:
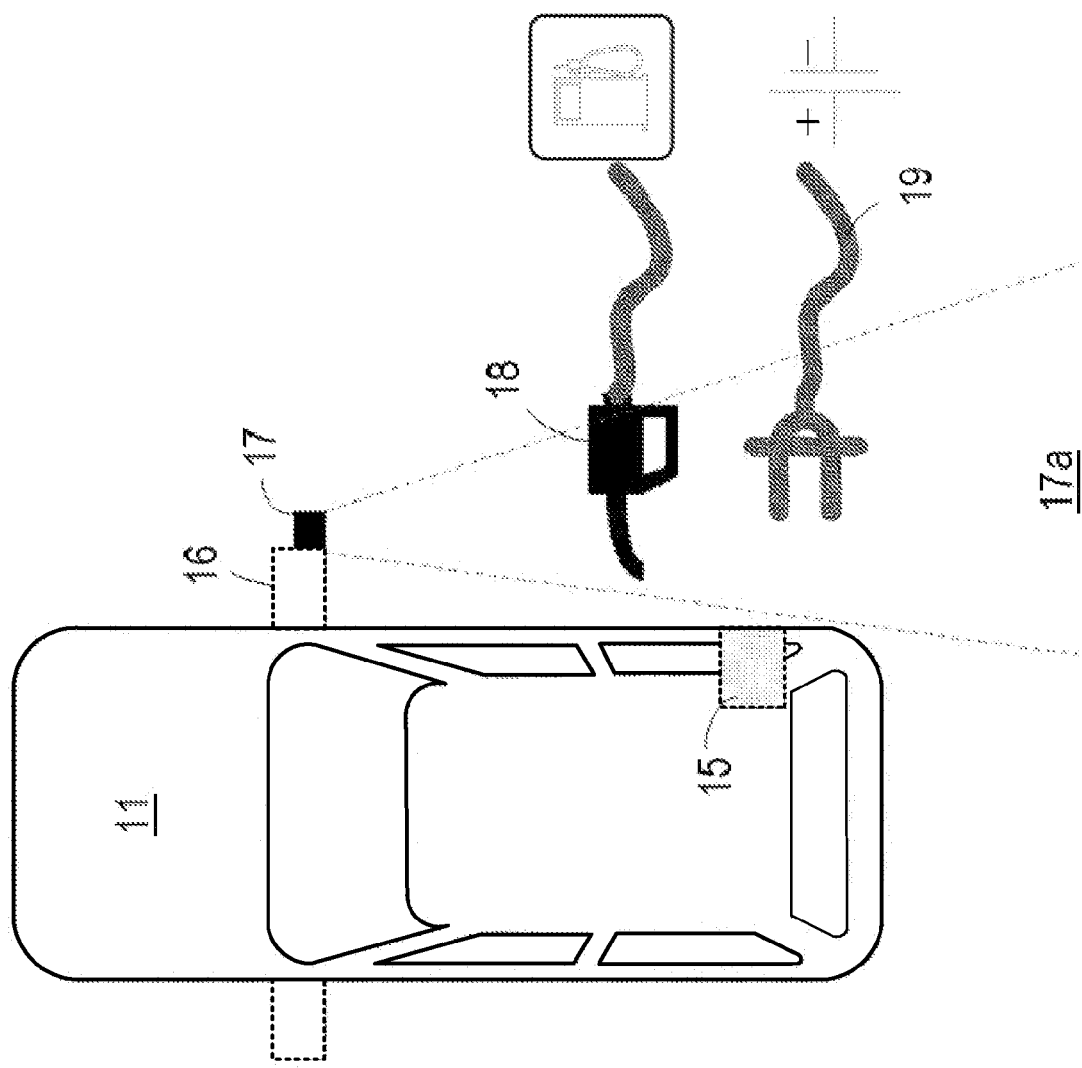
FIG. 3 shows a schematic illustration for explaining a possible camera/radar supported detection of a refueling process.

Furthermore, as shown in FIG. 2 the navigation system 220 may enable the device 10 to determine whether the motor vehicle is at a gas station (or charging station) during the refueling process. This enables activation of the emergency operating mode to be inhibited in situations in which filling the tank is carried out by means of a canister (e.g. on the driver's property), for instance. Furthermore, according to FIG. 2 the side of the motor vehicle 11 on which the filler cap is disposed can be monitored by means of an optional camera (e.g., rearward facing camera). The camera may be provided on the side mirror, in one example. In this way, an indication of a refueling process can be provided by means of an image processing or radar signal processing algorithm. A camera or radar unit can be used, such as is provided for a device for detecting the blind spot or for a parking assistance system and is installed in the side mirror of the motor vehicle 11. Such a device is schematically illustrated in FIG. 3, wherein a corresponding backward oriented sensor (such as e.g. a camera or radar unit) is indicated at 17 and may be attached to the exterior mirror 16 of the motor vehicle 11. By means of said sensor 17, according to FIG. 3, a field of view 17a is monitored, which may cover the fuel outlet for the fuel filler neck 18 (or the connection to an electric charging unit 19). The fuel tank of the motor vehicle 11 is indicated via numerical indicator 15.

Returning to FIG. 2, an external trigger signal can also optionally be transmitted from the gas station to the motor vehicle 11 in order to transmit the information to the motor vehicle 11 that a refueling process is taking place.

Continuing with FIG. 2, suitable output signals of one or a plurality of the previously described units and/or components 210 to 250 are transmitted to unit 400 for detecting the refueling process. The operation of unit 400 for detecting a refueling process is explained in detail below with reference to FIG. 4.

Figure 4:
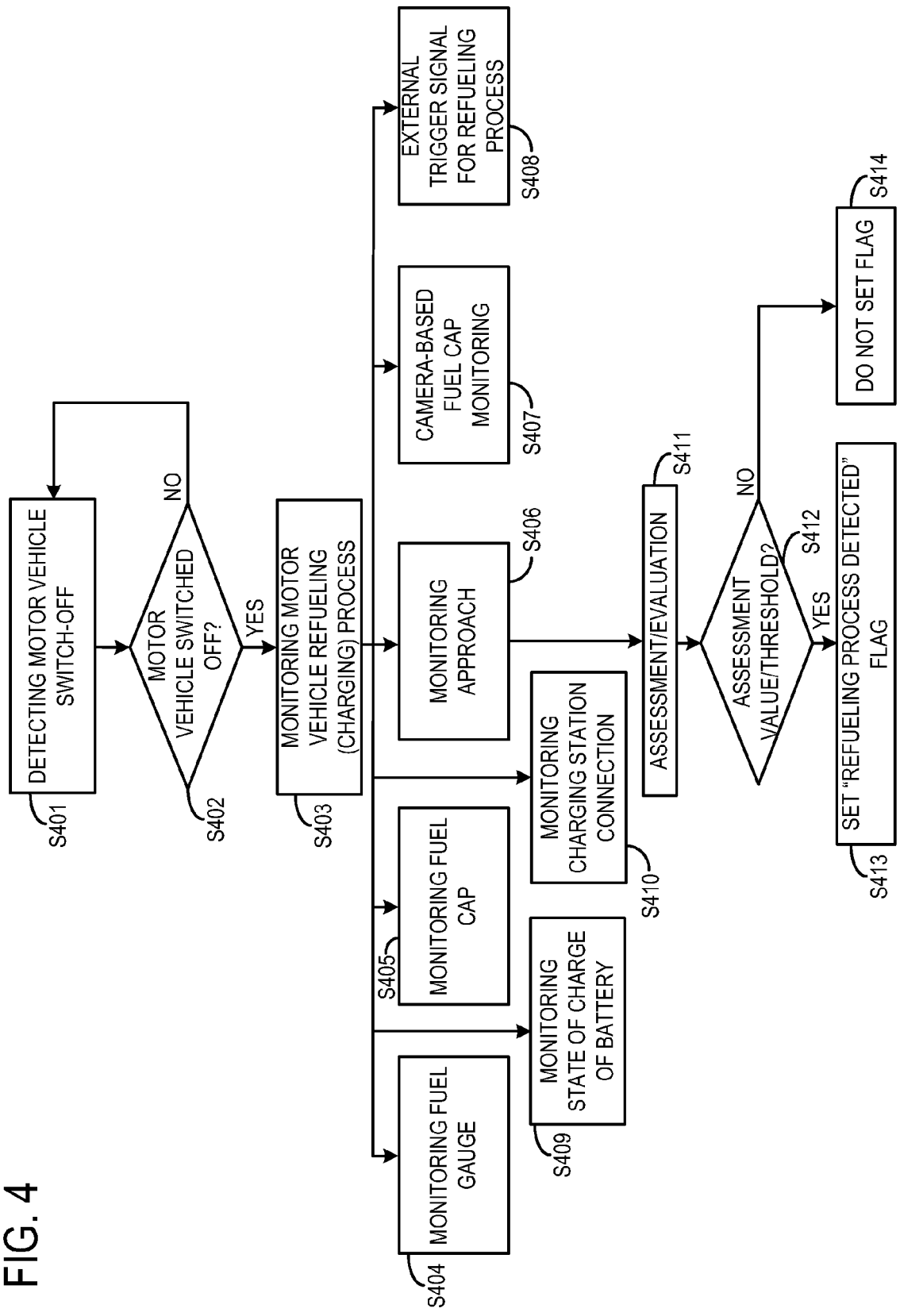
FIG. 4 shows an example flow chart to explain the detection of a refueling process taking place by a vehicle.

FIG. 4 shows a flow chart which may be implemented in unit 400. Thus, the flow chart shown in FIG. 4 may be a method for operating a vehicle. In step S401 detecting or monitoring whether the relevant motor vehicle or its engine is switched off initially takes place. At S402 it is determined if the motor vehicle is switched off. If it is determined that the motor vehicle is switched off (YES at step S402), the monitoring or detection of a refueling (charging) process of the relevant motor vehicle takes place in a subsequent step S403. However, if it is determined that the motor vehicle is not switched off (NO at step S402) the method returns to 401.

It is to be noted that for the purposes of the present description the term "fuel" is not restricted to gasoline or diesel fuel, but rather includes other possible energy sources such as electricity. Depending on the drive technology of the motor vehicle or the energy source used, the "refueling process" can thus also include charging of the motor vehicle, e.g. at an electric current or voltage source.

Said monitoring of the refueling process can include fuel gauge monitoring (S404), wherein the difference of the fuel gauge before and after the vehicle stop at the gas station can be monitored as an indication of a refueling process. According to FIG. 2, a monitoring device 210 used for this purpose can comprise a fuel display or device 211 for monitoring the fuel gauge or even a device 212 for monitoring the battery state depending on the energy source used.

Furthermore, monitoring or detecting the refueling process may also include monitoring the state/position of the filler cap (S405) if a suitable function is available. In other embodiments, depending on the type of vehicle or the source of drive energy used, the state of charge (SOC) of the battery can be monitored (S409) or whether the motor vehicle is connected to a charging station can be monitored or detected (S410). Other possibilities for detecting or monitoring the refueling process include detecting the proximity to the gas station or charging station (S406), e.g. by means of GPS navigation, camera-based monitoring of the filler cap (S407), which can take place according to FIG. 3 via the sensor 17 (e.g., camera, rear-ward facing camera) attached to the exterior mirror 16, or sending an external trigger signal by the gas station to indicate the refueling process (S408). In other embodiments, a chip ("RFID chip") provided in the fuel pump of the gas station can also be activated once fuel has been transferred from the fuel pump into the tank of the motor vehicle, wherein said chip can be designed to be readable by the vehicle system. In other embodiments, any other data monitoring device can be implemented at the gas station or charging station that checks any interactions between motor vehicles and the fuel pumps of the gas station and is able to perform a data exchange with the motor vehicles.

In the next step, based on one or a plurality of the steps S404 to S410, an assessment or evaluation (="scoring") is performed in step S411 in order to determine the probability that a refueling process is taking place. Step 412 determines if an assessment value/threshold if met. If according to the query in step S412 a hereby determined assessment value exceeds a pre-specified threshold value, a corresponding flag signal "refueling process detected" is set (step S413). Otherwise no corresponding flag signal is set (step S414).

With reference to flow chart shown in FIG. 5, the operation of unit 500 for detecting the payment process is described below using exemplary embodiments. Thus, the flow chart shown in FIG. 5 may be a method for operating a vehicle.

Figure 5:
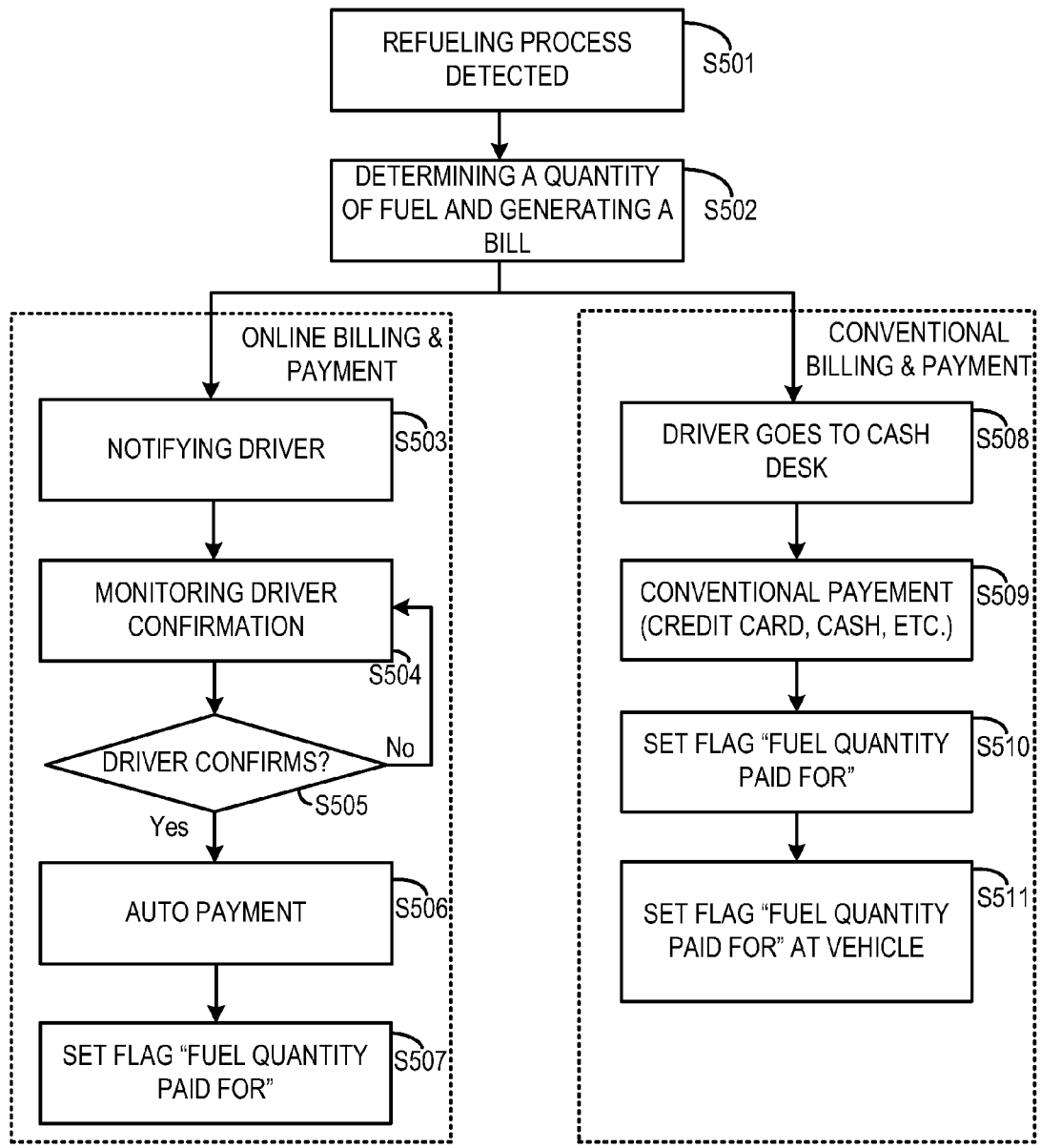
FIG. 5 shows an example flow chart for detailed illustration of a payment process as a preliminary stage to deactivating the emergency operating mode.

According to FIG. 5, determining the quantity of fuel and generating a bill (S502) initially take place in response to detecting the refueling process (S501). Thereafter, as shown in FIG. 5 in two alternative branches, billing and payment take place either "online" or in a conventional manner. In the case of "online" billing/payment there are initially a notification to the driver in step S503 and monitoring of the driver's confirmation (S504). If according to the query in step S505 there is a confirmation by the driver, a corresponding automatic or authorized payment (step S506) takes place (analogous to "online-payment" over the Internet), whereupon a corresponding flag signal "quantity of fuel paid for" is set (step S507).

In the alternative case of possible conventional billing or payment the driver goes to the cash desk of the gas station (step S508) and makes a conventional payment, by means of a credit card or cash (step S509) for example, whereupon a corresponding flag signal "quantity of fuel paid for" is set (step S510). Said flag signal "quantity of fuel paid for" is transmitted to the motor vehicle in a subsequent step S511, by means of a wireless transmission or even in a different manner, for example.

Figure 6:
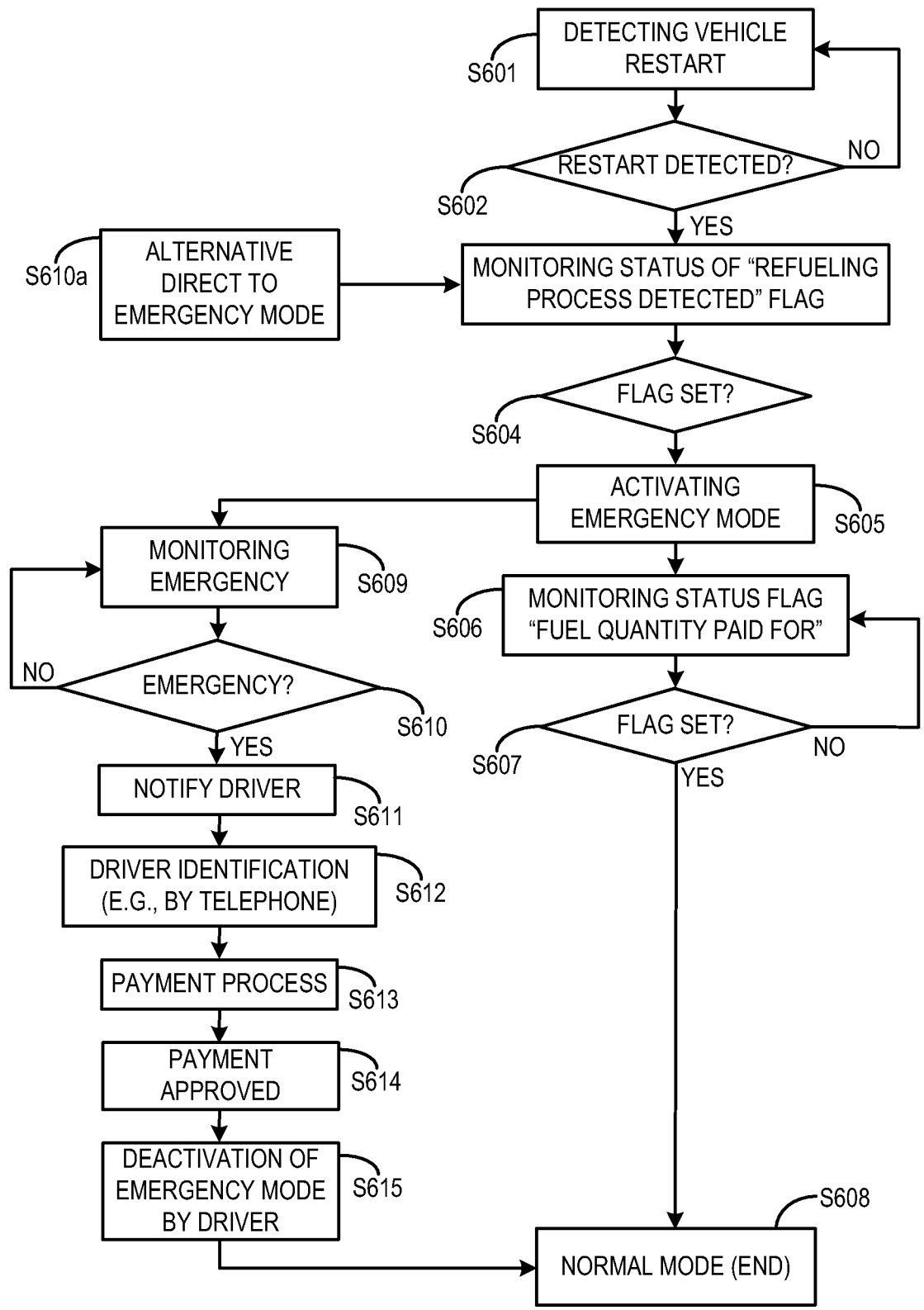
FIG. 6 shows an example flow chart depicting the activation or deactivation of the emergency operating mode.

Furthermore, the operation of unit 600 for activating or deactivating the emergency operating mode is described in detail with reference to FIG. 6. Thus, FIG. 6 shows a flow chart or method for operating a vehicle. According to FIG. 6, in step S601 it is first determined or detected whether the motor vehicle has been started. If this is the case according to the query in step S602, in a subsequent step S603 the status of the flag signal "refueling process detected" is monitored. Alternatively, a direct transition to the emergency operating mode can also take place (S601a).

If the flag signal "refueling process detected" is set according to the query in step S604, activating an emergency operating mode (="limp mode") takes place in a subsequent step S605. In said emergency operating mode the operating capability of the motor vehicle is drastically reduced, wherein especially according to one embodiment the motor vehicle or its driver can be enabled to release the space immediately adjacent to the relevant petrol pump process or charging station used for the refueling for other motorists and to move the motor vehicle to a parking space located close by (which is frequently available at a gas station).

In the next step monitoring of the status of the flag signal "quantity of fuel paid for" (step S606), as has been described previously with reference to FIG. 5, takes place (if monitoring of the emergency case described below with reference to the left branch in the flow chart of FIG. 6 is not taking place). Here it is determined whether the driver has paid for the refueling process or not. If this is the case according to the query in the subsequent step S607 or the corresponding flag character "quantity of fuel paid for" is set, the motor vehicle returns to the normal (i.e. not restricted) operating mode (step S608). Otherwise the emergency operating mode continues to be maintained and the status of the flag signal "quantity of fuel paid for" is monitored further by returning to step S606.

In response to activating the emergency operating mode in step S605, as already explained, emergency monitoring can optionally be initiated (step S609). Such an emergency can be the existence of a serious system fault (e.g. as a result of a hardware fault), which may prevent an orderly deactivation of the emergency operating mode or could cause faulty activation of the emergency operating mode with the motor vehicle switched off. In the event of such an emergency, the driver can be informed (e.g. personally, via a call center, by means of voice recognition controlled software or in another way such as visually) (step S611). Driver identification can especially also be carried in step S612 by means of a telephonic request for personal information (step S612), for example.

Then the transmission of information regarding the payment to be carried out by the driver takes place to initiate the payment process in step S613 and can, for example, take place online or even verbally. Once the payment process has been approved in subsequent step S614 following identification of the driver, the amount to be paid can be debited from the driver's account, whereupon deactivating the emergency operating mode by the driver and a transition to the normal mode of the motor vehicle (step S608) can take place in the subsequent step S615. The deactivation of the emergency operating mode by the driver in step S615 can take place only as an example by transferring a corresponding application ("app") into a driver's smart phone that enables the driver to deactivate the emergency operating mode, by means of a suitable reader in the motor vehicle, for example.

Figure 7:
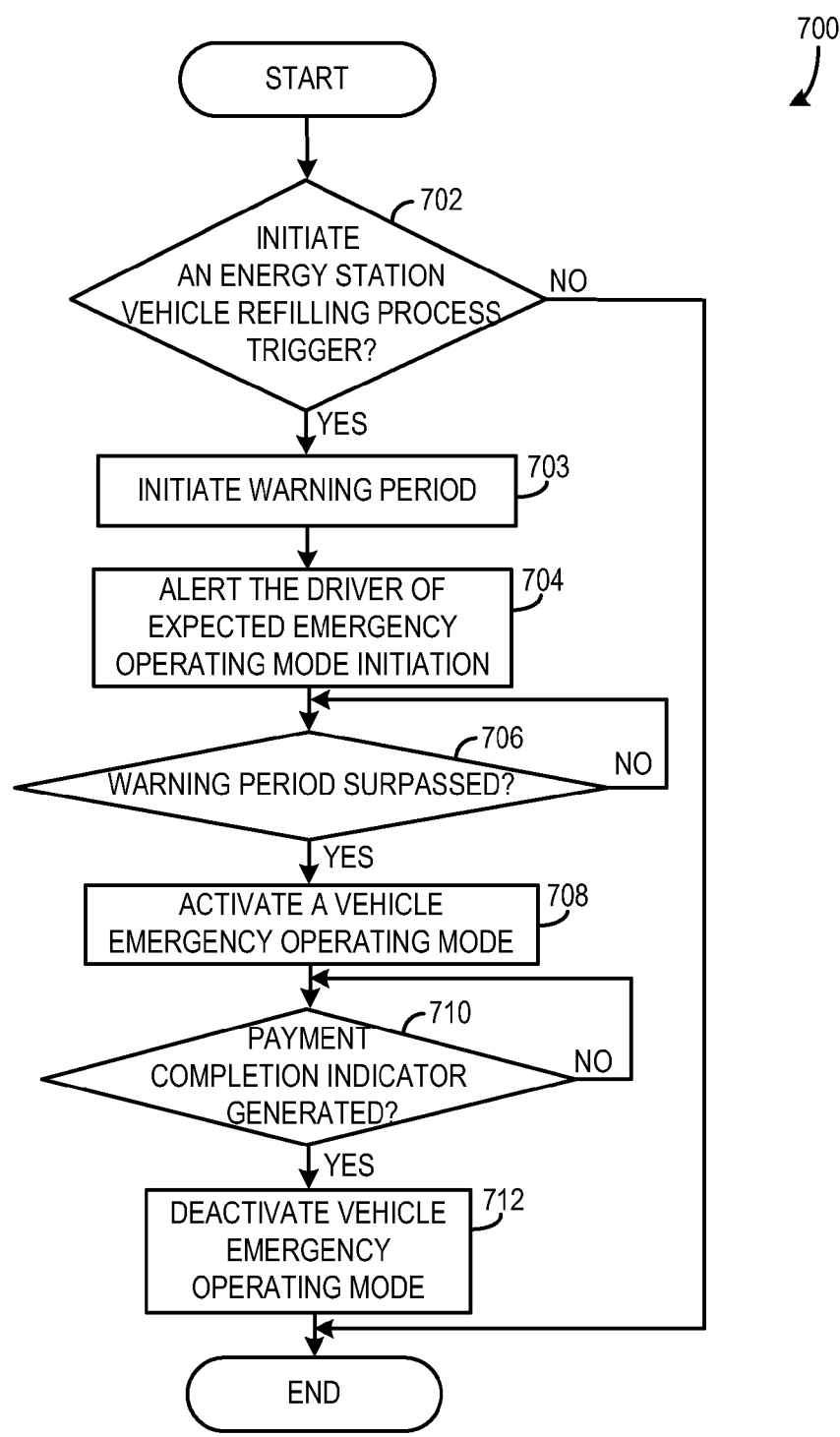
FIG. 7 shows a method for operation of a vehicle.

FIG. 7 shows a method 700 for operating a vehicle to reduce the likelihood of theft from an energy refilling station. The energy refilling station may be a refueling station (e.g., gas station) or a recharging station, for example. The method 700 may be implemented by the vehicle 11 discussed above with regard to FIGS. 1-3 or may be implemented via another suitable vehicle.

At 702 the method determines if an energy station vehicle refilling process trigger should be initiated. The energy station vehicle refilling process trigger may be initiated based on one or more of the following criteria; vehicle location (e.g., geographical location), fuel level, state of battery charge, refilling cap movement, a vehicle camera indicator, an external refilling trigger, etc. In one example, if it is determined that the vehicle location is near an energy refilling station and/or a fuel level or state of battery charge in the vehicle is increasing an energy station refilling process trigger may be initiated in the vehicle. In another example, a vehicle energy refilling process trigger may be initiated when the vehicle receives a signal from a refilling attendant at the refilling station. Still further in another example, a vehicle energy refilling process trigger may be initiated when a fuel cap sensor is triggered. It will be appreciated that additional vehicle sensors may be used to determine if the energy station vehicle refilling process trigger should be initiated. Additionally, the vehicle may receive an external signal from an energy station attendant which may initiate an energy station vehicle refilling process trigger, in one example. It will be appreciated that the method may be initiated in the vehicle through a control system including a code stored in memory executable by a processor.

If it is determined that an energy refilling process trigger should not be initiated (NO at 702) the method ends. On the other hand, if it is determined that an energy refilling process trigger should be initiated (YES at 702) the method advances to 703. At 703 the method including initiating a warning period. In one example, the warning period may be variable. For instance, the warning period may be adjusted based on weather, energy station type, geographical location, etc. However, in other examples the warning period may be a predetermined value. Next, at 704 the method includes alerting the driver of expected emergency operating mode initiation. The driver may be alerted of an expected emergency operating mode initiation through at least one of a visual cue presented on a display in the vehicle and an aural cue transmitted through a speaker in the vehicle.

At 706 the method includes determining if the warning period is surpassed. If it is determined that the warning period has not surpassed (NO at 706) the method returns to 706. On the other hand, if it is determined that the warning period has surpassed (YES at 706) the method advances to 708. At 708 the method includes activating a vehicle emergency operating mode. In the vehicle emergency operating mode the vehicle's speed may be limited. Specifically, in one example the vehicle speed is limited by controlling engine power output in the vehicle. For instance, throttle and/or fuel injection control may be adjusted to limit vehicle speed.

It will be appreciated that in other examples steps 703, 704, and 706 may be omitted from the method. Thus, the emergency operating mode may be initiated in direct response to determining that an energy station vehicle refilling trigger has been initiated.

At 710 the method determines if a payment completion indicator is generated. The payment completion indicator may be generated within the vehicle or through an outside component such as a computing device in the energy station. Specifically in one example, the payment completion indicator may be generated by the vehicle in response to receiving a payment completion data from a computing device associated with the energy station. In another example, the payment completion indicator may be generated by a computing device associated with the energy station and sent to the vehicle.

If it is determined if a payment completion indicator is not generated (NO at 710) the method returns to 710. On the other hand, if a payment completion indicator is generated (YES at 710) the method advances to 712. At 712 the method includes deactivating vehicle emergency operating mode. In this way, the vehicle emergency operating mode is deactivated in response to receiving a payment completion indicator for the energy station vehicle refilling process.

In this way, it is possible to limit vehicle speed to a greater extend responsive to a refueling operation than during other driving modes. For example, during a non-emergency operating mode, vehicle speed may be limited to a maximum road speed, such as 95 miles/hour based on vehicle standards, component protection, etc. However, during the refueling initiated emergency operating mode, vehicle speed may be limited to a lower maximum vehicle speed, such as 5 miles/hour, for example.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for preventing fuel theft at a gas station or a charging station for motor vehicles, comprising:
   with a radar device or a camera, determining whether a refueling process or recharging process of a motor vehicle is taking place; and
   activating an emergency operating mode of the motor vehicle until a payment for the refueling process or the recharging process has taken place, the emergency operating mode configured to limit vehicle speed.

2. The method according to claim 1, where the emergency operating mode is activated following a defined warning period.

3. The method according to claim 2, where a remaining warning period until activation of the emergency operating mode is displayed to the driver.

4. The method according to claim 3, where the defined warning period is variable and where the defined warning period is determined using at least one of the parameters time of day, ambient temperature, and geographical position.

5. The method according to claim 4, where the emergency operating mode is configured such that the speed achievable by the motor vehicle is limited to a maximum of 15 km/h.

6. The method according to claim 4, where the emergency operating mode is configured such that the speed achievable by the motor vehicle is limited to a maximum of 10 km/h.

7. The method according to claim 1, where the emergency operating mode is configured to enable low speed manoeuvers of the motor vehicle.

8. The method according to claim 1, where the emergency operating mode is deactivated once the payment for the refueling process or the recharging process has been carried out.

9. The method according to claim 1, where at least one of determining whether the refueling process or the recharging process of the motor vehicle and determining whether the payment has been made for the refueling process or recharging process take place through wireless communications.

10. The method according to claim 1, where determining whether the refueling process or the recharging process of the motor vehicle is taking place includes monitoring a fuel level or a state of charge of a battery of the motor vehicle.

11. A control system in a motor vehicle for preventing fuel theft at a gas station or charging station, comprising:
    non-transitory code stored in memory executable by a processor to:
      determine whether a refueling process or recharging process of a motor vehicle is taking place;
      if the refueling process or the recharging process is taking place, determine a warning period, the warning period varying based on at least one of the parameters time of day, ambient temperature, and geographical position;
      display to a driver of the motor vehicle a remaining portion of the warning period until activation of an emergency operating mode of the motor vehicle;
      following the warning period, activate the emergency operating mode only during the refueling or recharging process and only until a payment for the refueling process or the recharging process has taken place, the emergency operating mode configured to limit vehicle speed.

12. The control system according to claim 11, further comprising non-transitory code stored in memory executable by the processor to determine whether the refueling process or the recharging process of the motor vehicle is taking place using a camera or radar device.

13. The control system according to claim 11, further comprising non-transitory code stored in memory executable by the processor to determine whether the refueling process or the recharging process of the motor vehicle is taking place via a navigation system.

14. The control system according to claim 11, where the control system includes,
   a unit for determining whether the refueling process of a motor vehicle is taking place;
   a unit for determining whether the payment for the refueling process has been made; and
   a unit for activating or deactivating the emergency operating mode of the motor vehicle depending on the detection of the refueling process or a completed payment for the refueling process.

15. A method for operating a motor vehicle, comprising:
   determining a warning period, the warning period varying based on at least one of time of day, ambient temperature, and geographical position;
   displaying to a driver of the motor vehicle a remaining portion of the warning period until activation of an emergency operating mode of the motor vehicle;
   following the warning period, activating the emergency operating mode in response to initiation of an energy station vehicle refilling process trigger, and limiting vehicle speed to a greater extent during the emergency operating mode than during non-emergency operating modes.

16. The method of claim 15, further comprising deactivating the vehicle emergency operating mode in response to receiving a payment completion indicator for the energy station vehicle refilling process.

17. The method of claim 16, where completion of the energy refilling process is determined based on one or more of vehicle location, fuel level, fuel filler cap movement, state of battery charge, and an external refilling trigger, and wherein the limiting is active immediately upon the activation and maintained until the emergency operating mode is terminated upon completion of the refilling process.

18. The method of claim 15, where the vehicle speed is limited by controlling engine power output.

19. The method of claim 15, further comprising, alerting the driver of expected emergency operating mode activation during the warning period through at least one of a visual cue presented on a display in the vehicle and an aural cue transmitted through a speaker in the vehicle.

* * * * *